Oct. 4, 1960 C. E. PALMER 2,954,725
METHOD AND APPARATUS FOR FOLDING PLASTIC SHEET STOCK
Filed June 11, 1958 2 Sheets-Sheet 1

*INVENTOR.*
CHARLES E. PALMER
BY
*Lindsey and Prutzman*
ATTORNEYS

Oct. 4, 1960 C. E. PALMER 2,954,725
METHOD AND APPARATUS FOR FOLDING PLASTIC SHEET STOCK
Filed June 11, 1958 2 Sheets-Sheet 2

INVENTOR.
CHARLES E. PALMER
BY
Lindsey and Pretzman
ATTORNEYS

United States Patent Office 2,954,725
Patented Oct. 4, 1960

2,954,725
METHOD AND APPARATUS FOR FOLDING PLASTIC SHEET STOCK

Charles E. Palmer, Somers, Conn.

Filed June 11, 1958, Ser. No. 741,328

12 Claims. (Cl. 93—51)

This invention relates to an improved method of bending or folding sheet plastic and to improved apparatus for the fabrication of containers or the like from blanks of such material.

The term "plastic sheet" as used herein refers to sheet fabricated from organic polymers and having the properties of semi-rigidity, high flexural strength and a tendency to craze upon folding, and particularly to polystyrene sheet and other sheet polymers having properties similar thereto. The preferred plastic sheet is biaxially oriented polystyrene of about 5 to 17 mils thickness.

An important object is to provide improvements in folding dies for plastic sheet stock and the like.

Another important object is to provide an improved method of shaping, by folding, plastic sheet stock, for example, polystyrene or similar plastic sheet material, which resists satisfactory folding by techniques and apparatus commonly employed for the fabrication of articles from easily foldable sheet stock such as cardboard or metal stock.

A further object is to provide an improved plastic sheet stock folding apparatus particularly adapted for incorporation in high-speed container fabricating machinery.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Figs. 1, 2, and 3 are fragmentary views, partially in vertical section, of an improved folding die incorporating the invention and illustrating plunger mounted folding blades in three different sequential positions during a folding operation;

Figure 1:
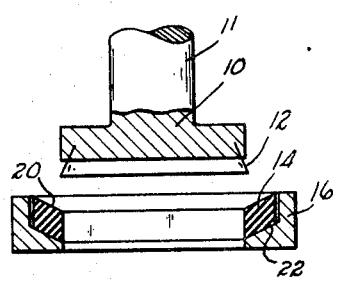
Figure 2:
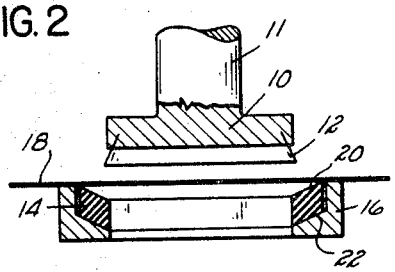
Figure 3:
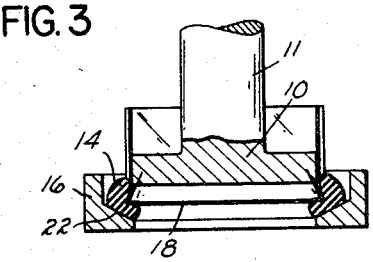

As shown in Figs. 1 through 3, a plunger 10 is carried on a shaft 11 which is connected for reciprocation in a vertical plane to a suitable known mechanism, not shown. Plunger 10 has fixed thereto four folding blades 12, the blades being positioned to depend from head 10 at an angle outwardly inclined from the axis of shaft movement in the configuration of a truncated pyramid. While the angle of blade inclination is not critical, the blades are preferably positioned such that the blade is substantially normal to the upper surface of the die pad which it engages. Fig. 1 shows plunger 10 positioned with blades 12 spaced above resilient die pads 14 which are loosely supported in pressure bars 16, pads 14 having inclined upper surfaces in vertical registry with at least the lower marginal portions of blades 12. The four blades 12 are disposed in rectangular configuration to fold a single blank of plastic sheet stock 18, positioned on pressure bars 16 and supported thereby, into container form as head 10 is lowered from the Fig. 1 to the Fig. 3 position. It will be understood that such a blank while not shown, is pre-cut to define center, side, and end panels with the center panel positioned in registry with the lower edges of blades 12, and that two spaced blades may be employed to fold sheet stock into a U-configuration, or that only one blade may be employed for a single folding operation as described below in respect to alternate embodiments of the invention.

Figure 4:
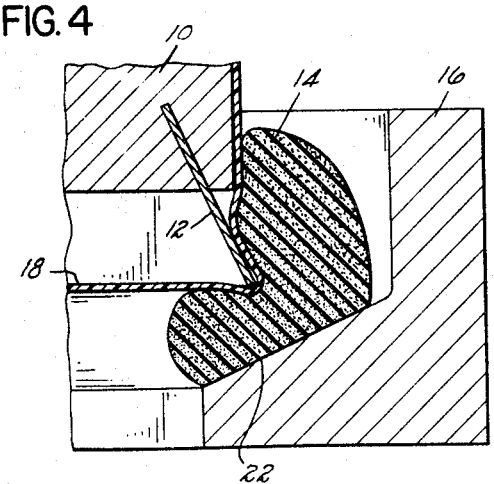
Fig. 4 is an enlarged fragmentary view in vertical section of the device of Figs. 1–3 and illustrating the manner in which flowable die pad material bends plastic sheet stock around a folding blade.

Die pads 14 are fabricated from a resiliently deformable and flowable material such as sponge rubber, the pads being attached to pressure bars 16 only along their inner bottom margins such as by an adhesive, not shown, to permit the pad material freely to flow around the outer surface of blade 12 as best shown in Fig. 4. Other material may be used in place of sponge rubber provided it has those characteristics and quickly assumes its original shape upon removal of the deforming pressures. Fig. 1 shows the plunger mounted folding blades positioned above the pressure block mounted die pads to allow clearance to position a plastic sheet stock blank 18 therebetween as shown in Fig. 2. The plunger is then lowered to force the blank material into the die pads and about the blades as shown in Fig. 3. As illustrated in Fig. 4, the pad material rises upwardly and inwardly out of its pressure block positioning channel as the blade presses the sheet stock downwardly into the pad to cause the pad material to flow against the outer blade surfaces.

The center panel portion of the blank material, which is positioned between the blades, is held taut by the blade edges, and as the pad material starts to flow around the blade edge and toward the inclined outer blade wall, a snubbing action results to maintain the blank material between the blades sufficiently taut to resist deformation of the center panel by that portion of the pad material inwardly of the blade margins. The blank material outwardly of the blade edge, being unstressed, is readily folded back against the outer blade surface by the flowing pad material to an angle greater than 90 degrees, and preferably to an angle of about 120 degrees when right angles are to be formed in the blank material, since most plastic sheet stock which is of the type to retain a permanent bend or fold must be over-folded to compensate for a relax characteristic inherent therein. Biaxially oriented polystyrene sheet stock of the type sold under the trademark Polyflex by Monsanto Chemical Company, Springfield 2, Massachusetts, sheet stock has such characteristics, and the present invention has been found particularly effective for use in fabricating articles of that material.

It will be noted that blades 12 are positioned in substantial right angularity to the upper surfaces 20 of the die pads 14, the pads shown being of trapezoidal cross sectional configuration and supported on pressure bar surfaces 22 of the same angle of inclination as the upper surface of the die pads 14. These angular relations between the blades, pads and pressure bar surface have proved particularly effective, especially when at least one pair of spaced blades are employed to simultaneously fold plastic sheet stock into U-configuration or alternately to form box-like structures with two sets of blades disposed to form a rectangle.

Figure 5:
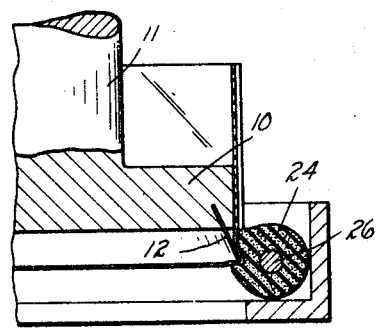
Fig. 5 is a fragmentary view partially in vertical section showing an alternate embodiment of the invention.
Figure 6:
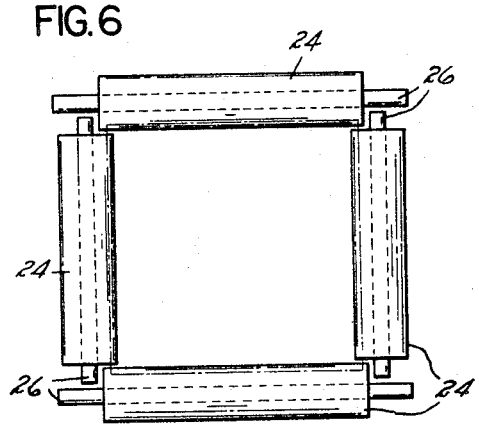
Fig. 6 is a top plan view of the device of Fig. 5.

Figs. 5 and 6 show an alternate embodiment of the invention wherein the die pads are in the form of rollers 24 of flowable material rotatably supported on center shafts 26. A single pair of rollers may be employed to bend blanks into U-configuration, two pairs being shown in Fig. 6 for the formation of rectangular enclosures in the manner above described in connection with the structure of Figs. 1 through 4. The roller-type dies permit the plunger to continue past the dies and discharge the folded blank therebelow, hence they may be used to advantage in high speed fabricating equipment. The same principle of folding is employed, and the rollers may either be freely rotatable or friction mounted. By using a roller arc segment in place of a complete roller, the effective diameter may be increased when desirable. By use of a roller or a segment, the bulk of the flowable die material is directed to the outer side of the folding blade as shown in Fig. 5.

Figure 7:
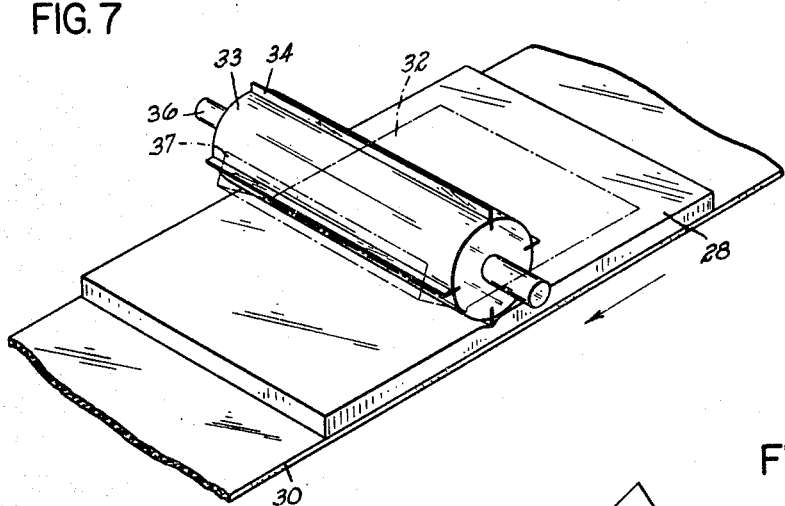
Fig. 7 is a perspective view illustrating high-speed folding apparatus with a further alternate embodiment of the invention incorporated therein.

A further adaptation of the invention is illustrated in the Fig. 7 structure wherein a die pad 28 of rubber or the like is supported by a movable member 30 which may be a heavy conveyor belt or a rigid moving platform. A plastic blank 32 is carried by die pad 28 in the arrow direction past a roller 33, driven in a clockwise direction as shown and provided with a plurality of radially extending folding blades 34, the roller shaft 36 being suitably journaled, not shown, above pad 28 to cause the blades 34 to depress the blank 32 substantially into pad 28 and fold the blank material about both sides of the blades. While substantially a 180 degree fold results, the folding pressures involved are of less magnitude than with the plunger type of folding above mentioned and the resulting fold, with the blank material relaxed, has been found to be about ninety degrees, such a fold being shown at 37.

Figure 8:
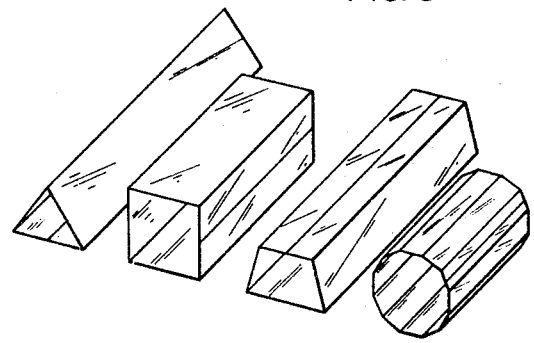
Fig. 8 is a perspective view illustrating various types of sheet plastic article forms which may be produced by the device of Fig. 7.

As is readily apparent, the moving die pad and rotating blade structure, only the basic elements of which are described to teach the folding principle, is ideally suited for incorporation in high speed container fabricating machinery. Since the folded blank leaves the die pad as it moves away from the roller, the blank is free of stress during each fold and the blank may be easily removed from the conveyor as its trailing edge clears the roller. Some of the open ended enclosures which may rapidly be formed by a continuous process wherein an endless conveyor belt moves a plurality of die pads past a blade roller are illustrated in Fig. 8. Blanks requiring folding only in a central portion thereof may be folded as desired by employing shorter blades, hence the principles may be employed as a first step in the fabrication of closed end containers.

Figure 9:
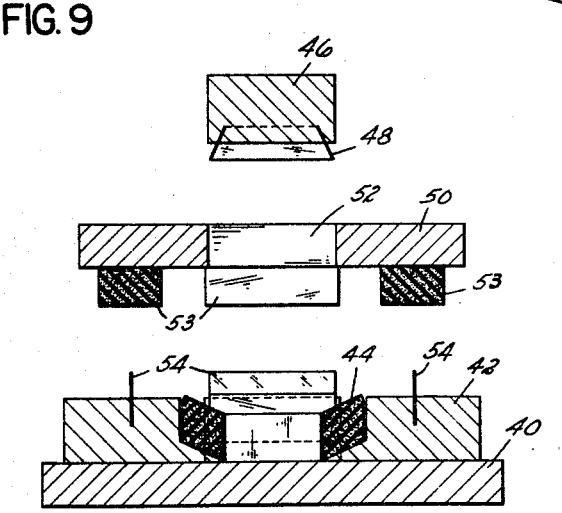
Fig. 9 is an exploded view in vertical section of folding apparatus for the high-speed production of marginally flanged rectangular containers from a cut plastic blank.

Fig. 9 illustrates a two-step type folding die wherein the invention is employed in each step. Base 40 supports pressure blocks 42 having die pads 44 disposed in rectangular configuration, both the blocks and dies being of the type first described above for simultaneous folding of side and end wall panels in right angularity to a center panel. A plunger 46 carries four depending blades 48 which define a frusto-pyramid, with blades 48 in vertical registry with pads 44. A pressure block 50 is positioned above block 42 and is provided with a rectangular central aperture 52 and four rubber-like die pads 53. Block 42 is provided with four vertically extending folding blades 54, each in registry with one of the pads 52. Both plunger 46 and pressure plate 50 are mounted for reciprocation in a vertical plane by means not shown.

Fig. 9 is an exploded view, and with the three components shown in an open or blank receiving position, plunger 46 is positioned in aperture 52 with the lower edges of blades 48 about in the plane of the lower surfaces of pads 53, those pads being positioned above blades 54 a sufficient distance to allow feeding a blank therebetween. With a blank defining a rectangular center panel and side and end wall panels resting on blades 54 with the center wall margins in registry with blades 48, plate 50 is lowered to cause pads 53 to fold portions of the side and end wall panels about blades 54 in much the manner that a fold is obtained by the structure of Fig. 7. Plate 50 is then raised to position pads 53 slightly above blades 54 and the folded outer portions of the wall panels remain bent downwardly over the blades. Plunger 46 is then lowered to fold the four wall panels in right angularity to the center panel as above described, the latter folding action resulting in the folded outer portions of the wall panels being drawn over blades 54. These two steps, performed in sequence, result in the blank, originally in the general shape of a cross, being formed into a box-like rectangular container with outwardly extending marginal flanges, which may, if of transparent plastic, be mounted on a display card, for example, as an article display container.

As described and illustrated herein, the present invention is practiced in apparatus without heated dies or the requirement for preheating the plastic sheet, it being a major advantage that by practice of this invention it is unnecessary to apply heat to the plastic sheet thus enabling folding at greater speeds than heretofore possible.

As will be apparent to persons skilled in the art, various modifications and adaptations of the structure above described will become readily apparent without departure from the spirit and scope of the invention, the scope of which is defined in the appended claims.

I claim:
1. The method of folding a blank of plastic sheet stock having a rectangular center panel and integral side and end panels to form a container, said method comprising supporting the blank on die pads of rubber-like material aligned with the margins of said center panel and moving rigid folding blades, aligned with said die pads into contact with the margins of said center panel to force said margins into said die pads and cause said rubber-like material to flow about the outer surfaces of said folding blades and bend the side and end panels to form a rectangular enclosure.

2. The method of folding blanks of plastic sheet comprising positioning a blank of plastic sheet between a die pad of resiliently deformable material and a rigid folding blade, and depressing the blank into the resiliently deformable material of the die pad sufficiently to cause the deformable material to flow and fold the blank about the blade to establish a permanent fold in said blank.

3. The method in accordance with claim 2 wherein said plastic sheet is folded about the blade to an angle greater than 90° to provide a substantially vertical fold upon relaxation of the plastic sheet.

4. The method of folding biaxially oriented polystyrene sheet comprising positioning a blank of said polystyrene sheet on a die pad of resiliently deformable material; moving a folding blade into contact with the blank and depressing the blank into the pad to cause the deformable material to flow and draw the blank about the edge of the blade and along a side thereof to establish a permanent fold of the desired angle.

5. The method for folding plastic sheet material comprising providing a pair of parallel, rigid folding blades and a pair of rotatably mounted die pads having marginal portions of resiliently deformable material, supporting plastic sheet upon said die pads, moving said folding blades into contact with said plastic sheet, the path of movement of said blades being displaced inwardly of the axes of said die pads and intersecting the marginal portions thereof, depressing said plastic sheet into the resiliently deformable material of said die pads to fold the plastic sheet about the edges of the blades, and further moving said folding blades past the die pads to disengage the folded plastic sheet by imparting rotation to said die pads.

6. The method of folding plastic sheet comprising providing a die pad of resiliently deformable material and a rotatable die having a folding blade, supporting a blank of plastic sheet on said die pad and rotating said die in contact with the plastic sheet while applying sufficient pressure thereupon for the folding blade to depress the plastic sheet into the resiliently deformable material of the die pad to fold the plastic sheet about the edge of the folding blade.

7. In apparatus for folding plastic sheet, a support, a die pad of resiliently deformable material mounted on said support, a member movable in said support to and from said die pad, and a rigid folding blade carried by said member for engagement with a blank of plastic sheet supported on the die pad to depress the plastic sheet into the resiliently deformable material for folding about the edge of the blade.

8. The apparatus in accordance with claim 7 wherein said folding blade is inclined relative to the axis of movement of the movable member.

9. In apparatus for folding blanks of form-sustaining plastic sheet into containers and the like, a support having an aperture therein, a pair of die pads rotatably carried by said support with their axes in parallel relationship, said die pads having marginal portions of resiliently deformable material extending laterally into the aperture, a member mounted for movement to and through said aperture, and a pair of parallel, rigid folding blades on said member aligned with the marginal portions of said die pads to depress a blank of plastic sheet supported thereon into the resiliently deformable material of said die pads for folding about the blades and to further push a folded plastic blank through said aperture by imparting rotation to said die pads.

10. In apparatus for folding plastic sheet stock into container form, a support, four upright folding blades fixed to said support in rectangular configuration, four die pads of resiliently deformable material spaced inwardly of said folding blades to define a centrally open rectangular die, a second support provided with a central aperture and having fixed thereto four die pads of resiliently deformable material in registry with said folding blades, means mounting said second support for movement to and from said blades, and a plunger mounted for movement through the aperture of said second support to and from said first die pads, said plunger having fixed thereto four folding blades in rectangular configuration in registry with said first die pads, whereby a sheet stock blank defining center, side and end wall panels may be supported on said first blades with margins of said center panel in registry with the plunger blades, said second support moved toward said blades to cause the resiliently deformable material of its die pads to fold the side and end panels about said first blades respectively, said second member then being withdrawn and said plunger depressed to cause its blades to force the margins of said center panel into said first mentioned die pads and about said plunger blades.

11. In apparatus for folding plastic sheet, a support, a pair of die pads of resiliently deformable material mounted on said support in spaced parallel relationship, a plunger mounted for reciprocation in said support to and from said die pads, and a pair of folding blades mounted on said plunger in parallel spaced relation in alignment with said die pads, said blades being inclined to the plunger axis with the free ends of the blades diverging, whereby a blank of plastic sheet supported on said die pads is folded into U-shaped configuration by movement of said plunger to cause said blades to depress said blank into the resiliently deformable material of said die pads and cause the pad material to fold the blank about a side of the blades.

12. In apparatus for folding plastic sheet, a support, a die pad of resiliently deformable material, a die rotatably carried by said support and a rigid folding blade on said die, the edge of said folding blade depressing the resiliently deformable material of the die pad during operative alignment thereof, whereby rotation of said die will cause the folding blade to depress a blank of plastic sheet positioned on said die pad into the resiliently deformable material of the die pad to cause the resilient material to fold the blank about the edge of the blade.

References Cited in the file of this patent

UNITED STATES PATENTS

| | | |
|---|---|---|
| 1,348,369 | Morrison | Aug. 3, 1920 |
| 2,357,806 | Borkland | Sept. 12, 1944 |
| 2,403,377 | Kelley | July 2, 1946 |
| 2,516,624 | Guyer | July 25, 1950 |
| 2,749,867 | Engel | June 12, 1956 |